(No Model.)

G. VALIANT.
BOOT OR GLOVE FASTENER.

No. 310,098. Patented Dec. 30, 1884.

Witnesses.
J. B. Fetherstonhaugh
Charles C. Baldwin

Inventor.
George Valiant
by Donald C. Ridout & Co
Attys.

UNITED STATES PATENT OFFICE.

GEORGE VALIANT, OF TORONTO, ONTARIO, CANADA.

BOOT OR GLOVE FASTENER.

SPECIFICATION forming part of Letters Patent No. 310,098, dated December 30, 1884.

Application filed May 17, 1884. (No model.)

*To all whom it may concern:*

Be it known that I, GEORGE VALIANT, of the city of Toronto, in the county of York, in the Province of Ontario, Canada, manufacturer, have invented a certain new and useful Boot or Glove Fastener; and I do hereby declare that the following is a full, clear, and exact description of the same.

The object of the invention is to devise a neat and effective substitute for a button, to which the part having the button-hole may be connected without difficulty, and without the necessity for employing a button-hook; and it consists, essentially, of a plate or bar having a groove or passage-way made in it, extending from a point near one of its ends to a point near the head formed on its other end, and connected to the portion of the boot or glove where buttons are usually attached by a pin or staple arranged to fit into the groove or passage-way, so that while connecting the plate or bar in position the said plate or bar may be adjusted longitudinally, that it may be drawn forward to bring the pin or staple to the tail of the bar or plate, when the bar or plate may be turned over on its back, the pin or staple acting as its pivot, or when the bar or plate is drawn back, so as to force the pin or staple against the end of the groove or passage-way near the head of the plate or bar, it will be held down and prevented turning over, substantially as and for the purpose hereinafter explained.

Figure 1:
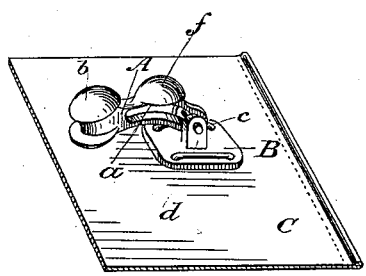
Figure 2:
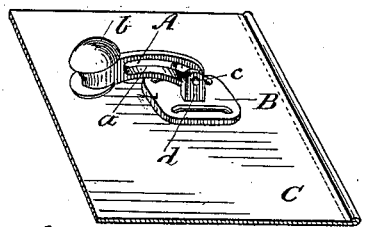
Figure 3:
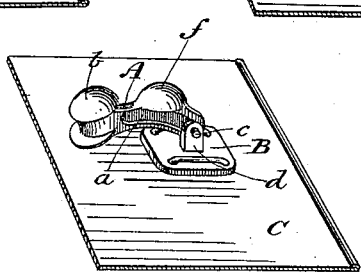
Figure 4:
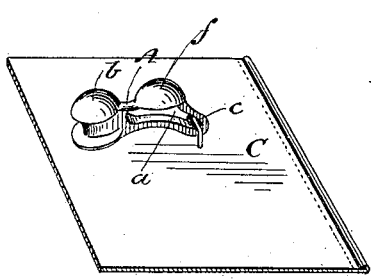
Figure 5:
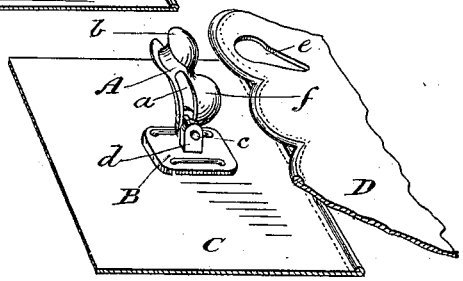
Figure 6:
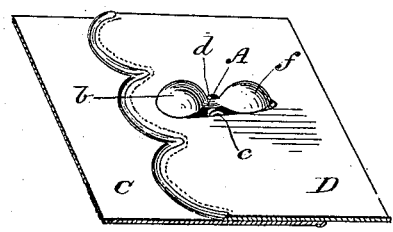

Figure 1 is a perspective view of my improved fastener, showing it attached in position by a pin passing over the groove or slot, which pin is connected to two jaws on a plate fastened to the material. Fig. 2 is a similar view, but the plate or bar has only one button-head formed on its top. Fig. 3 is a similar view with two button-heads, like Fig. 1, but with the pin fitting into a groove made instead of the slot or passage-way shown in Figs. 1 and 2. Fig. 4 shows an ordinary staple for connecting my improved fastener to the material. Fig. 5 shows the fastener tipped up, in position ready to receive the button-hole, which is also exhibited. Fig. 6 shows the button-hole slipped over the button-fastener.

All the views in the drawings represent the same fastening device, being merely slightly altered in form, the point of the invention being to so form and pivot the bar or plate A that the button-hole may be easily slipped over it, and that when pressed into a horizontal position the drawing strain of the parts connected by the fastening shall lock the same.

It will be noticed that I form a passage-way, $a$, on the bar or plate, which passage-way extends from a point near the head $b$ to the tail of the bar, the thickness of the metal between the slot or passage-way $a$ and the end of the bar being only sufficient to give the necessary strength.

$c$ is a pin fixed to the jaws $d$, which form part of or are fastened to the flat plate B. This latter plate is sewed or otherwise fastened to the material C, which is supposed to represent that portion of the material to which the button is usually attached. Sufficient space is left between the pin $c$ and the top of the flat plate B to allow the metal forming the bottom side and tail end of the slot $a$ to pass freely between them. Consequently when the bar A is drawn forward, so as to bring its tail end against the pin $c$, the said bar can easily be turned over on its back, or in the position it is shown in in Fig. 5. It will be noticed that the head $b$ is grooved, so that the button-hole $e$ may readily be slipped over the head $b$ into the said groove.

In order to connect the button-hole piece D to the button-piece C, it is merely necessary to throw the bar A back in the position it is shown in in Fig. 5, when the button-hole may be slipped over it. Then by pushing down the bar into a horizontal position the strain between the two parts thus connected will draw the bar B back till the pin $c$ comes in contact with the head end of the slot. When in this position, the fastener is locked, as the bar A cannot be turned on the pivot-pin $c$ until the bar has been drawn forward so as to bring the pin $c$ against the tail end of the slot $a$, when the bar will naturally be drawn over on its back and the button-hole piece immediately released.

I have shown in some of the figures a false head, $f$, which I prefer to use, as it hides the button-hole, as shown in Fig. 6; but of course, as far as the fastener is concerned, the bar A would work equally as well without it. I also prefer employing a flat plate, B; but the same effect could in a large measure be obtained by using simply a staple, which I have shown in Fig. 3, and marked c.

The slot or passage-way a will be found the simplest form; but the bar A might be arranged to operate without a slot. For instance, a groove, which I have marked a in Fig. 3, might be used instead of the slot or passage-way.

I mention these modifications, as I do not wish to be limited to the exact shapes shown.

What I claim as my invention is—

1. The bar or plate A, having a slot or groove, a, made in it, and a head, b, formed at one end, in combination with a pin or staple, c, secured to the material, substantially as and for the purpose specified.

2. A bar or plate, A, having a slot or groove, a, made in it, and a grooved head, b, formed at one end of it, in combination with a flat plate, B, fixed to the material C, and having jaws d, between which the bar A is inserted, and a pin, c, to pass through the slot a, substantially as and for the purpose specified.

3. A bar, A, having a groove or slot, a, formed in it, and heads b and f formed on it, in combination with a pin, c, arranged to connect the bar to the material, substantially as and for the purpose specified.

Toronto, May 3, 1884.

GEORGE VALIANT.

In presence of—
J. J. HARTON,
A. VALIANT.